United States Patent
Kelley et al.

(10) Patent No.: US 11,263,619 B2
(45) Date of Patent: Mar. 1, 2022

(54) SECURE CREDIT CARD WITH NEAR FIELD COMMUNICATIONS

(71) Applicant: EBAY INC., San Jose, CA (US)

(72) Inventors: Edward E. Kelley, Wappingers Falls, NY (US); Franco Motika, Hopewell Junction, NJ (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/981,484

(22) Filed: Dec. 28, 2015

(65) Prior Publication Data

US 2016/0148193 A1    May 26, 2016

Related U.S. Application Data

(60) Continuation of application No. 14/491,706, filed on Sep. 19, 2014, now Pat. No. 9,286,605, which is a
(Continued)

(51) Int. Cl.
*G06Q 20/34* (2012.01)
*G06Q 20/38* (2012.01)
(Continued)

(52) U.S. Cl.
CPC ......... *G06Q 20/352* (2013.01); *G06K 7/0008* (2013.01); *G06K 7/10237* (2013.01);
(Continued)

(58) Field of Classification Search
CPC .............. G06Q 20/327; G06Q 20/341; G06Q 20/3552; G06Q 20/381; G06Q 20/382;
(Continued)

(56) References Cited

U.S. PATENT DOCUMENTS 4,812,805 A     3/1989   Lachat et al.
4,885,778 A * 12/1989   Weiss ........................ G07F 7/10
                                                        713/184
(Continued)

FOREIGN PATENT DOCUMENTS

JP           62249275      10/1987
WO    2006/100171 A1   9/2006

OTHER PUBLICATIONS

PCT International Preliminary Report on Patentability in PCT/EP2006/060443, dated Sep. 25, 2007, 6 pages.
(Continued)

*Primary Examiner* — Thien T Mai
(74) *Attorney, Agent, or Firm* — FIG. 1 Patents

(57) ABSTRACT

A near field communication device included in a secure transaction card provides an addition and/or transitional communication link for communicating secure transaction information. The near field communication device may be selectively engaged or disengaged and, when engaged, either active or passive modes of operation of the near field communication device can be selected. in the active mode, secure transaction information is transmitted upon establishment of a communication link with a complementary near field communication device. In the passive mode, secure transaction information is transmitted upon interrogation from a complementary near field communication device. Secure transaction information is generated and stored for transmission in a memory and at least a portion of the memory is erased or nulled upon transmission or upon expiration of a selected period of time.

20 Claims, 4 Drawing Sheets

Related U.S. Application Data continuation of application No. 11/462,814, filed on Aug. 7, 2006, now Pat. No. 8,840,030, which is a division of application No. 10/907,208, filed on Mar. 24, 2005, now Pat. No. 7,128,274.

(51) Int. Cl.
| | |
|---|---|
| *G06K 7/10* | (2006.01) |
| *G06K 19/07* | (2006.01) |
| *G06K 19/073* | (2006.01) |
| *G06Q 20/32* | (2012.01) |
| *G06Q 20/40* | (2012.01) |
| *G07F 7/10* | (2006.01) |
| *G06Q 20/22* | (2012.01) |
| *G06K 7/00* | (2006.01) |

(52) U.S. Cl.
CPC ....... *G06K 7/10297* (2013.01); *G06K 19/073* (2013.01); *G06K 19/0723* (2013.01); *G06Q 20/2295* (2020.05); *G06Q 20/32* (2013.01); *G06Q 20/3278* (2013.01); *G06Q 20/341* (2013.01); *G06Q 20/3415* (2013.01); *G06Q 20/355* (2013.01); *G06Q 20/382* (2013.01); *G06Q 20/40* (2013.01); *G06Q 20/4093* (2013.01); *G07F 7/1008* (2013.01)

(58) Field of Classification Search
CPC .... G06Q 20/346; G06Q 20/385; G06Q 50/12; G06Q 30/06; G06Q 20/322; G06Q 20/32; G06Q 20/42; G06Q 20/20; G06Q 30/0241; G06Q 20/352; G06Q 20/18; G06Q 20/401; G06Q 30/04; G06Q 20/102; G06Q 20/202; G06Q 20/34; G06Q 20/3415; G06Q 30/0222; G06Q 30/0277; G06Q 30/0641; G06Q 40/02; G06Q 20/04; G06Q 20/10; G06Q 20/0855; G06Q 20/12; G06Q 20/14; G06Q 20/40; G06Q 20/3278; G06Q 20/40145; G06Q 20/321; G06Q 20/0652; G06Q 20/3672; G06Q 20/22; G06Q 20/204; G06Q 20/425; G06Q 20/3674; G06Q 20/355; G06Q 20/4093; G07F 7/0886; G07F 7/1008; G07F 7/10; G07F 7/1016; G07F 7/1091; H04M 1/0254; G06F 7/582; G06F 21/34; G06F 21/725; G06K 7/0008; G06K 19/0723; G06K 7/10237; G06K 7/10297; G06K 7/10723; G06K 9/00288; G06K 9/00268; G06K 9/00281; G06K 9/00845; G06K 9/00979; G06K 9/4642; G06K 9/00335; G06K 9/00671; G06K 2209/05; G06K 7/0004; G06K 7/084; G06K 7/087; G06K 9/32; G06K 9/3233; G06K 19/06037; G06K 19/06112; G06K 7/10722; G06K 7/12; G06K 7/1413; G06K 7/1417; G06K 17/0022; G06K 19/07762; G06K 9/00087; G06K 19/073; G06K 19/07707; G06K 2009/00939; G07C 1/20; G07C 9/00023; G07C 9/00111

See application file for complete search history.

(56) References Cited

U.S. PATENT DOCUMENTS

| | | |
|---|---|---|
| 5,140,517 A | 8/1992 | Nagata et al. |
| 5,351,187 A | 9/1994 | Hassett |
| 5,408,633 A | 8/1995 | Katsumura et al. |
| 5,446,266 A | 8/1995 | Beuk et al. |
| 6,145,035 A | 11/2000 | Mai et al. |
| 6,266,413 B1 | 7/2001 | Shefi |
| 6,273,339 B1 | 8/2001 | Tuttle et al. |
| 6,388,628 B1 | 5/2002 | Dettloff et al. |
| 6,515,919 B1 | 2/2003 | Lee |
| 6,641,050 B2 | 11/2003 | Kelley et al. |
| 7,128,273 B2 | 10/2006 | Kelley et al. |
| 7,128,274 B2 | 10/2006 | Kelley et al. |
| 7,346,061 B2* | 3/2008 | Takayama .......... G06K 7/10237 370/395.4 |
| 8,840,030 B2 | 9/2014 | Kelley et al. |
| 9,286,605 B2 | 3/2016 | Kelley et al. |
| 2002/0079367 A1 | 6/2002 | Montani |
| 2002/0123967 A1 | 9/2002 | Wang |
| 2002/0129250 A1 | 9/2002 | Kimura |
| 2003/0085286 A1* | 5/2003 | Kelley ................. G06K 19/073 235/492 |
| 2004/0054592 A1* | 3/2004 | Hernblad ............... G06Q 50/12 705/15 |
| 2004/0061518 A1 | 4/2004 | Watanabe et al. |
| 2004/0066273 A1 | 4/2004 | Cortina et al. |
| 2004/0118913 A1 | 6/2004 | Boettiger |
| 2005/0035847 A1 | 2/2005 | Bonallet et al. |
| 2005/0040242 A1 | 2/2005 | Beenau et al. |
| 2005/0077356 A1 | 4/2005 | Takayama et al. |
| 2005/0082366 A1 | 4/2005 | Yamagami et al. |
| 2005/0091338 A1 | 4/2005 | de la Huerga |
| 2005/0823266 | 4/2005 | Yamagami et al. |
| 2005/0109841 A1 | 5/2005 | Ryan et al. |
| 2005/0116026 A1 | 6/2005 | Burger et al. |
| 2005/0131834 A1* | 6/2005 | Rodriguez ............. G06Q 20/12 705/64 |
| 2005/0171898 A1* | 8/2005 | Bishop .................. G06Q 20/00 705/39 |
| 2005/0205566 A1 | 9/2005 | Kassayan |
| 2005/0222961 A1* | 10/2005 | Staib .................... H04M 1/0254 705/64 |
| 2005/0269402 A1* | 12/2005 | Spitzer ................. G07F 7/0886 235/380 |
| 2006/0213972 A1 | 9/2006 | Kelley et al. |
| 2006/0266822 A1 | 11/2006 | Kelley et al. |
| 2007/0125620 A1* | 6/2007 | Sorenson ............. H04M 17/10 194/217 |
| 2015/0012440 A1 | 1/2015 | Kelley et al. |

OTHER PUBLICATIONS

PCT International Search Report and Written Opinion in PCT/EP2006/060443, dated May 19, 2006, 7 pages.
U.S. Appl. No. 10/907,208, Advisory Action dated Jan. 24, 2006, 3 pages.
U.S. Appl. No. 10/907,208, Amendment and Response filed Sep. 12, 2005, 23 pages.
U.S. Appl. No. 10/907,208, Amendment and Response filed Jan. 3, 2006, 26 pages.
U.S. Appl. No. 10/907,208, Amendment and Response filed Jul. 24, 2006, 8 pages.
U.S. Appl. No. 10/907,208, Ex Parte Quayle Action dated May 22, 2006, 7 pages.
U.S. Appl. No. 10/907,208, Notice of Allowance dated Aug. 25, 2006, 8 pages.
U.S. Appl. No. 10/907,208, Office Action dated Jun. 23, 2005, 10 pages.
U.S. Appl. No. 10/907,208, Office Action dated Nov. 2, 2005, 12 pages.
U.S. Appl. No. 11/462,814, Advisory Action dated Nov. 14, 2008, 4 pages.
U.S. Appl. No. 11/462,814, Advisory Action dated May 14, 2010, 3 pages.
U.S. Appl. No. 11/462,814, Amendment and Response filed Dec. 13, 2007, 17 pages.
U.S. Appl. No. 11/462,814, Amendment and Response filed Oct. 7, 2008, 14 pages.
U.S. Appl. No. 11/462,814, Amendment and Response filed May 7, 2009, 11 pages.

(56) References Cited

OTHER PUBLICATIONS

U.S. Appl. No. 11/462,814, Amendment and Response filed Nov. 20, 2009, 10 pages.
U.S. Appl. No. 11/462,814, Amendment and Response filed Apr. 19, 2010, 14 pages.
U.S. Appl. No. 11/462,814, Amendment and Response filed Mar. 28, 2011, 11 pages.
U.S. Appl. No. 11/462,814, Appeal Brief filed Nov. 15, 2011, 32 pages.
U.S. Appl. No. 11/462,814, Boards Decision dated Apr. 30, 2014, 7 pages.
U.S. Appl. No. 11/462,814, Examiner's Answer to Appeal Brief dated Dec. 21, 2011, 10 pages.
U.S. Appl. No. 11/462,814, Notice of Allowance dated Jul. 3, 2014, 7 pages.
U.S. Appl. No. 11/462,814, Office Action dated Sep. 13, 2007, 8 pages.
U.S. Appl. No. 11/462,814, Office Action dated Aug. 7, 2008, 7 pages.
U.S. Appl. No. 11/462,814, Office Action dated Feb. 12, 2009, 10 pages.
U.S. Appl. No. 11/462,814, Office Action dated Aug. 21, 2009, 10 pages.
U.S. Appl. No. 11/462,814, Office Action dated Feb. 18, 2010, 11 pages.
U.S. Appl. No. 11/462,814, Office Action dated Dec. 28, 2010, 8 pages.
U.S. Appl. No. 11/462,814, Office Action dated Jun. 13, 2011, 9 pages.
U.S. Appl. No. 11/462,814, Reply Brief filed Feb. 21, 2012, 9 pages.
U.S. Appl. No. 14/491,706, Amendment and Response filed Oct. 21, 2015, 7 pages.
U.S. Appl. No. 14/491,706, Notice of Allowance dated Nov. 5, 2015, 7 pages.
U.S. Appl. No. 14/491,706, Office Action dated Jul. 21, 2015, 7 pages.
Restriction Requirement received for U.S. Appl. No. 10/907,208, dated Mar. 9, 2006, 5 Pages.
Restriction Requirement received for U.S. Appl. No. 11/462,814, dated Mar. 17, 2008, 5 Pages.

* cited by examiner

SECURE CREDIT CARD WITH NEAR FIELD COMMUNICATIONS

CROSS-REFERENCE TO RELATED APPLICATIONS

This application is a of Continuation application Ser. No. 14/491,706 filed Sep. 19, 2014, entitled "Secure Credit Card With Near Field Communications," which in turn is a Continuation of application Ser. No. 11/462,814 filed Aug. 7, 2006, entitled "Secure Credit Card With Near Field Communications," now U.S. Pat. No. 8,840,030, issued Sep. 23, 2014, which in turn is a Division of U.S. patent application Ser. No. 10/907,208 filed Mar. 24, 2005, entitled "Secure Credit Card With Near Field Communications," now U.S. Pat. No. 7,128,274, issued Oct. 31, 2006 the disclosures of which are herein incorporated by reference.

FIELD OF THE INVENTION

The present invention generally relates to so-called smart cards and, more particularly to alternative uses of highly secure credit/identification cards and, more particularly, to providing such functions through a near field communications infrastructure.

BACKGROUND OF THE INVENTION

Proliferation of fraudulent activities such as identity theft, often facilitated by streamlining of electronic financial transactions and the proliferation of credit and debit cards often used in such transactions, has led to great interest in techniques for improving security and authentication of the identity of a user of such credit and debit cards. In particular, the streamlining of transactions has led to the proliferation of credit card readers which read information from a magnetic stripe formed on a surface of a credit card and which are often integrated with point-of-sale terminals such as cash registers and fuel pumps. In such cases, it is left to the customer to manipulate the card through the reader where the card is read and, in some cases, the read information is used to automatically print a memorandum of the transaction for signature by the customer to complete the transaction. In other cases, such as transactions at fuel pumps, no action is taken by sales personnel at all and the transaction is completed automatically based only on the information read from the credit card and with no verification of customer identity. In such streamlining of transactions the principal amount of time and effort saved is at the expense of the small and possibly unreliable but very important safeguard provided by the opportunity for sales personnel to at least compare the signature of a customer on a sales memorandum with the signature on the credit card to authenticate customer identity and possibly detect unauthorized use of the credit card. Nevertheless, loss of this important security feature is evidently considered by the public, merchants and financial institutions to be more than balanced by the capability for worldwide, near real-time tracking of credit card use and usage profiling provided by the reading of credit card data and immediate communication to financial institutions to accept or reject any individual transaction as well as the expediting of transactions and the continuity of possession of the credit card by the customer. On the other hand, the monitoring of credit card transactions and transaction profiling may also cause rejection of transactions which are, in fact, legitimate such as those of a person who may travel only infrequently, causing attempted transactions while traveling to be rejected since the identity of the credit card user cannot be authenticated based on magnetic stripe information and temporally proximate transactions at remote locations, as might occur due to transactions immediately before and after air travel, may lead to an inference of credit card theft.

Recent advances in semiconductor technology, particularly extremely thin substrates, has also allowed chips to be fabricated with substantial mechanical flexibility and robustness adequate for inclusion of electronic circuits of substantial complexity within conveniently carried cards physically similar to credit cards currently in use. Such technology has also allowed records of substantial information content to be similarly packaged and associated with various articles, living organisms or persons such as maintenance records for motor vehicles or medical records for humans or animals. In regard to increase of security for financial transactions however, various attempts to increase security through improved identity authentication or disablement in case of theft or other misuse, while large in number and frequently proposed have not, until recently, proven adequate for the purpose.

However, a highly secure credit or debit card design has been recently invented and is disclosed in U.S. Pat. No. 6,641,050 B2, issued Nov. 4, 2003, and assigned to the assignee of the present invention, the entire disclosure of which is hereby fully incorporated by reference for details of implementation thereof. In summary, the secure credit/debit card disclosed therein includes a keyboard or other selective data entry device, a free-running oscillator, an array of electronic fuses (e-fuses) or other non-volatile memory, a processor, a pair of linear feedback shift registers (LFSRs) and a transmitter/receiver to allow communication with an external card reader. The card is uniquely identified by a unique identification number and the programming of e-fuses which control feedback connections for each of the LFSRs, one of which is used as a reference and the other is used in the manner of a pseudo-random number generator, the card identification number and the feedback connections together forming a pre-initialized personality configuration of the card. The card is activated only for short periods of time sufficient to complete a transaction by entry of a personal identification number (PIN) that can also be permanently programmed into the card. When the card is activated and read by a card reader, the two sequences of numbers generated by the LFSRs are synchronously generated and a portion thereof is communicated to a reader which not only authenticates the number sequences against each other and the card identification number but also rejects the portion of the sequence if it is the same portion used in a previous transaction to guard against capture of the sequences by another device. This system provides combined authentication of the holder/user and the card, itself, together with encryption of transaction information unique to each card which renders the card useless if stolen while providing highly effective protection against simulation and/ or duplication of the card or capture of information from it and has proven highly effective in use.

However, in its preferred form and to obtain the highest levels of security, a special reader including a complementary receiver and transmitter is required to, in effect, allow direct communication in real-time between the secure credit card and the authentication processor at the financial institution or other authorization facility. While such special readers may be manufactured in quantity and distributed at relatively low cost and do not require a change in the communication system for reporting authentication and transaction information to a financial institution, the number of communications may cause some noticeable delay in completion of transactions. Further, implementing the system of the above-incorporated patent may require an extended period of time and the special readers may be subject to some degree of wear or damage in use which may compromise the functionality thereof. Such a compromise of functionality may reduce the acceptability of the secure credit/identification card system and cause erroneous rejection of transactions, particularly when it is considered that number sequences of significant length must be communicated error-free in order to authorize a transaction. Provision of power to support even the relatively rudimentary communications involved with the above-incorporated secure credit/identification card has also presented relatively intractable problems compromising reliability when in use.

So-called near field communication (NFC) systems have recently become known and standards therefor have recently been ratified. In accordance with that standard, for NFC systems are limited to a range of only about 10 cm and are capable of a bit transfer rate of 424 kilobits per second using a carrier frequency of 13.56 MHz. Similarly to radio frequency identification (RFID) systems (on which the new NFC standard is based), a principal function contemplated for NFC devices is the capacity to interrogate them in a passive mode in which they consume no power and to have a unique code previously stored therein rapidly and reliably returned in a manner which does not interfere with other wireless communications and which minimizes or avoids interference from such other wireless communications whenever such an interrogation is made. Accordingly, NFC systems transmit information by inductive electromagnetic coupling in the radio frequency portion of the spectrum. The NFC standard also provides for software which enables nearly instantaneous peer-to-peer network setup. NFC devices thus effectively seek each other and establish a communication link between themselves in sharp contrast to, for example, so-called Bluetooth enabled devices in which, while also intended for short range peer-to-peer communications, set up procedures are complex and extended, largely to establish device configuration which is unnecessary in NFC systems. This networking facility is in sharp contrast to RFID systems which are set up in a master/slave relationship in which usually passive chips or transponders are read by relatively expensive, powered reader devices having a range of about two to five meters. NFC systems also differ from other types of known wireless communication systems such as so-called "Wi-Fi systems which generally require an access hub. Further, NFC devices can be set to either an active or passive mode such that identification data can be sent even when the device is off and consuming no power. Even in an active mode, the range of NFC devices is so small that very little power is consumed, Accordingly, NFC devices have been implemented in single chips and chip sets for a wide variety of applications.

SUMMARY

It is therefore an object of the present invention to provide an alternative communication arrangement for communications incident to transaction using a secure credit/identification card and which does not require a specialized card reader.

It is another object of the invention to provide an alternative and/or transitional communication infrastructure for use with the above-incorporated secure credit card.

It is a further object of the invention to provide an arrangement for adapting current credit card readers to accommodate communications with a secure credit card similar to that disclosed in the above incorporated patent.

It is yet another object of the present invention to improve speed of communications and establishment of communication links and to provide improved reliability of communications for providing a high degree of security for transactions such as financial and identification transactions.

In order to accomplish these and other objects of the invention, there is provided, in combination, a near field communication device, including memory for storing information to be returned upon interrogation thereof; and an arrangement for nulling a portion of said memory upon expiration of a selected period of time.

In accordance with another aspect of the invention, a secure card and system including a secure card is provided wherein the card comprises a card body which incorporates a microprocessor device, a read only memory device and a secure linear feedback shift register, the microprocessor device being interfaced to the read only memory device containing a pre-initialized personality configuration being comprised of both a unique card identification and a customized secure linear feedback shift register initial configuration, a reference linear feedback shift register incorporated in said card body and synchronized to the secure linear feedback shift register, a security code generator incorporated in the card body and producing a security code utilizing the secure linear feedback shift register providing outputs which, when combined with the card identification, produce a security code uniquely based upon said pre-initialized personality configuration accessible by the microprocessor; and a communication interface incorporated in the card body and connected to the microprocessor device for providing an input/output message function of the secured information between the microprocessor and an agent outside the secure card body, said communication interface further including a near field communication device.

In accordance with a further aspect of the invention, a method of communicating secure transaction information is provided comprising steps of selectively engaging a near field communication device in a secure transaction card, upon engagement of said near field communication device, generating secure transaction information, storing the secure transaction information in a memory for transmission by the near field communication device, and nulling a portion of the memory upon transmission of the secure transaction information or upon expiration of a selected period of time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION AND BEST MODE

Figure 1A:
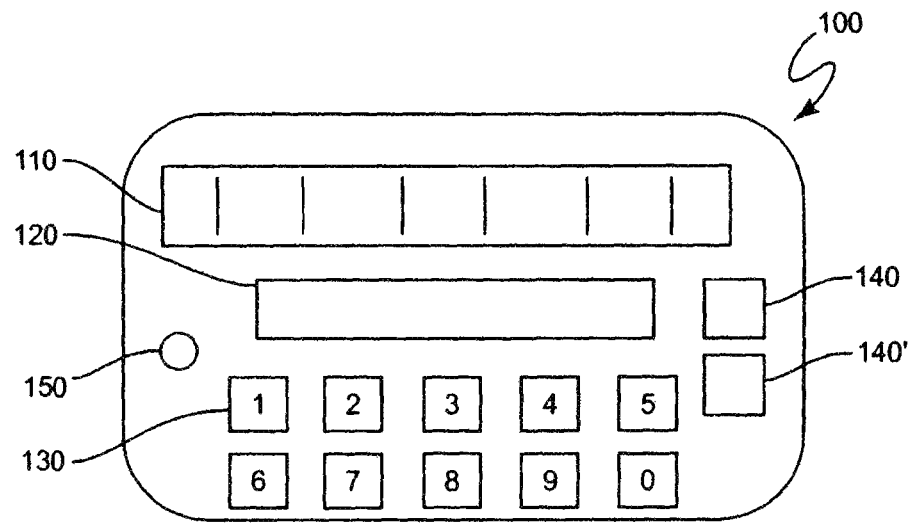
FIGS. 1A and 1B illustrate a preferred form of the secure credit card and a schematic depiction of operative elements contained within a secure credit card in accordance with the present invention, respectively.
Figure 1B:
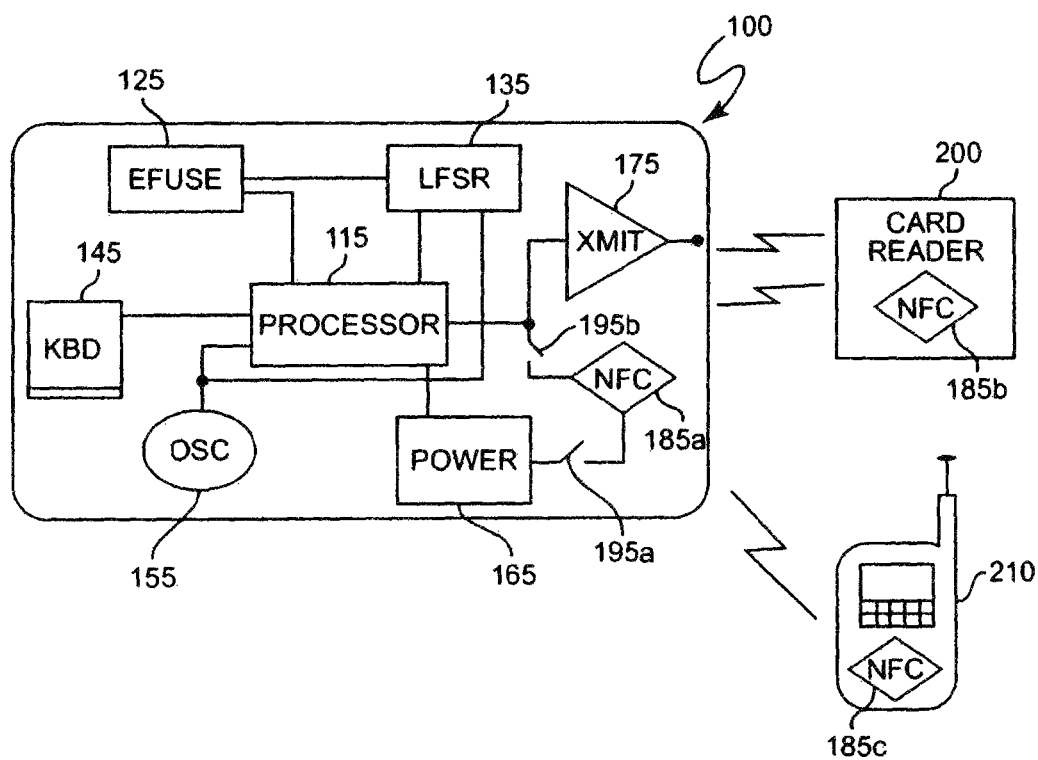

Referring now to the drawings, and more particularly to FIGS. 1A and 1B, there is shown a secure credit card similar (and possibly identical externally) to that disclosed in the above-incorporated patent. It should be recognized that while the preferred environment and use of the present invention is in connection with financial transactions in a manner similar to the well-known use of credit or debit cards, such card structures may be used for many purposes such as personal identification and for obtaining controlled access to secure areas or apparatus such as machinery or data processing systems or resources; exemplary types of which are discussed in U.S. patent application Ser. No 10/906,692, assigned to the assignee of the present invention and hereby fully incorporated by reference. It is therefore to be understood that the term "credit card" as used hereinafter is intended to comprehend and be a collective reference to all such and similar uses of such structures Similarly, the term "transaction card" may be used to indicate possible use for either financial or access authorization transactions or both.

As shown in FIG. 1A, the secure credit card 100 in accordance with the invention physically resembles a conventional credit card of a type currently in use but includes input and display features somewhat similar to calculator devices which are currently available having similar dimension to a credit card. That is, the secure credit card preferably includes photocells 110 which may be one of several alternative power sources (e.g. a battery, external power contacts and/or an inductive power coupling arrangement which could also or alternatively be provided to supply charge to a rechargeable power source such as a small battery or capacitor within the card. A single or multiple digit/character display 120 is preferably provided to display prompts to a user. As an input device, numeric keypad 130 and/or a dynamic key 140 (with single character/digit display) are included, preferably as membrane switches to achieve a very small thickness and a degree of flexibility as well as resistance to physical damage. A status indicator 150 may be provided in addition or alternatively to display 120. Provision of only a status indicator or a dynamic key is considered to be more secure (since it does not display input data which might be seen by a person other than a user or only a single character/digit at a time which may not be the character/digit selected) but may not provide a user with information to correct an input error during an input. If keypad 130 is used, some or all keys may be multi-function keys (e.g. to provide yes or no responses during certain operational states) or even used dynamically in conjunction with a display.

FIG. 1B schematically depicts the internal elements of secure credit card 100. Most of the elements depicted and their operation and cooperation are discussed in detail in the above-incorporated U.S. Pat. No. 6,641,050 and a summary thereof herein will be sufficient to enable practice of the invention by those skilled in the art. Central to the operation of the secure credit card is a processor 115 which receives input directly from e-fuses 125 and from linear feedback shift registers (LFSRs) 135. Feedback paths in LFSRs 135 which cause them to operate as unique pairs of pseudo-random sequence generators are also controlled by e-fuses 125. Processor 115 also receives inputs from keyboard unit 145, discussed in regard to various suitable forms 130, 140 thereof, above. When the secure credit card is activated by, for example, input of a personal identification number (PIN) or code which authenticates the user to the card, the LFSRs 135 generate an identification code for the card and preferably a pair of synchronized sequences of pseudo-random numbers, one used as a reference and the other to authenticate the card to the authorization system and possibly other transaction-specific information which can optionally or alternatively be supplied by a card reader or other point-of-sale apparatus. These signals are then placed in a desired transmission format (e.g. with other signals such as packet header(s)) and transmitted directly or stored for transmission upon interrogation by the transaction authorization system. The output of processor 115 is provided to a transmitter/output driver 175. All of these elements receive power from a power supply unit 165 which may be provided in a plurality of different forms, as discussed above.

In accordance with the invention, an additional near field communications element 185*a* is also selectively provided in parallel with transmitter/output driver 175 through an arrangement depicted as switch 195*b*; a preferred form of which will be described in greater detail below. Power is selectively provided thereto through another arrangement preferably provided by additional functions of processor 115 but schematically depicted here as switch 195*a*. The secure credit card 100 is thus provided with an additional communication path with a card reader 200 which is equipped or retrofit with a complementary NFC device 185*b* installed therein and/or with a communication path to another communication device 210 such as a cell phone, personal digital assistant (PDA), palmtop or laptop computer and the like which may be equipped or retrofit with an NFC device 185*c* installed therein. These additional communication paths provide for at least two system architectures, and variations thereof, which support numerous additional modes of use with attendant improvement of security for varying circumstances as well as accommodating the secure credit card by alternative communication devices or inexpensively retrofit and upgraded existing card readers; some exemplary forms of which will now be discussed with reference to FIGS. 2 and 3.

Figure 2:
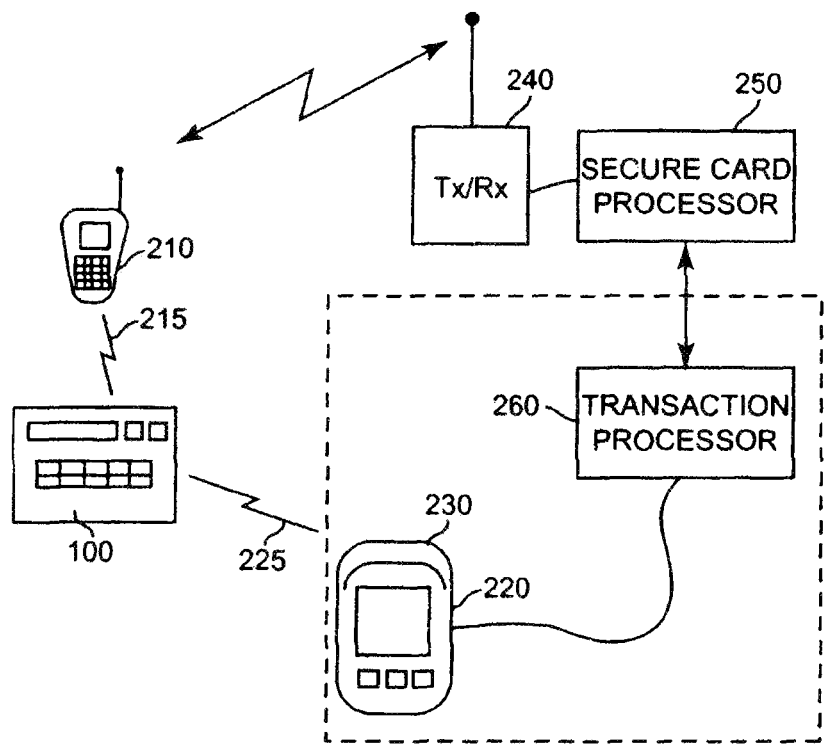
FIGS. 2 and 3 are block diagrams of communication systems in accordance with the present invention, and FIGS. 4 and 5 form a flow chart illustrating preferred operation of the invention.

Referring now to FIG. 2, a first preferred system architecture is schematically illustrated. This architecture is similar to that depicted in FIG. 2 of concurrently filed U.S. patent application Ser. No. 10/907,207, now U.S. Pat. No. 7,128,273, which is assigned to the assignee of the present invention and fully incorporated by reference in its entirety. That system provides an alternative and transitional communication arrangement for authenticating users and authorizing transactions using either a conventional magnetic stripe credit card or universal credit card by writing secure transaction and authentication information on a magnetic stripe thereof or normal credit card transactions using a conventional magnetic stripe credit card using a secure credit card holder functioning in much the same manner as the secure credit card of the above-incorporated U.S. Pat. No. 6,641,050 but communicating with a secure card processor through a separate communication device 210 such as a cell phone, PDA or computer having a wireless (or wired) connection, possibly through a network. In accordance with the present invention, however, communication link 215 is made wireless and the link is created and the communication conducted by simply, having activated the secure credit card, passing it in close proximity to the separate communication device 210. Similarly, communication link 225 to card reader 220 is created and the communication conducted simply by passing the secure credit card in close proximity to the card reader 220. Therefore, it is not necessary to physically read a magnetic stripe on the card or create a communication link by placing the secure credit card in or passing it through a reading location such as slot 230 in card reader 220 since the invention selectively provides for a link to be made to an agent outside the secure card body through an NFC device. It should also be understood in regard to the present invention that the communication path through communication device 210, transmitter/receiver 240, secure card processor 250 to transaction processor 260 may be used to the exclusion of the communication path through card reader 220 and transaction processor 260 to secure card processor 250 or vice-versa or the two paths may be used together, depending on security aspects of the transaction (e.g. security of the location in which the card must be activated), transitional state of the authentication system between use of conventional cards and use of the secure credit card of the above-incorporated U.S. Pat. No. 6,641,050 or that of the present invention, required expeditiousness of the transaction and other like concerns. For example, the secure credit card in accordance with the invention can be activated and authentication of the card and user performed (as will be described in detail below) well before reaching the point of sale which may be crowded and security thus reduced or, alternatively, if merchant information can be input to the secure credit card in accordance with the invention prior to reaching the point of sale, the transaction can be substantially completed without use of card reader 220 and very little, if any, action required at a point-of-sale. Thus, the system architecture of FIG. 2 provides substantial flexibility in the manner in which a transaction can be conducted and accommodates a wide variety of transitional states of implementing or upgrading the communication infrastructure in order to accommodate secure credit cards of the type disclosed in the above-incorporated Patent or the present invention.

Figure 3:
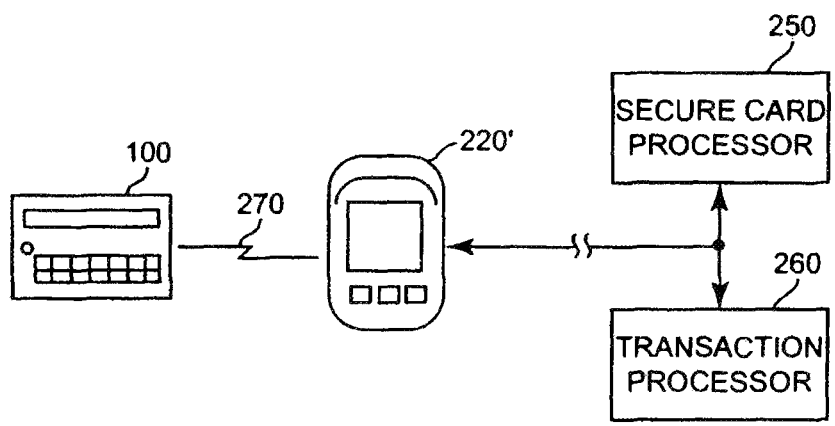

Referring now to FIG. 3, another system architecture which provides transitional and transactional advantages in some common circumstances will now be discussed. In this case, card reader 220' represents a potentially unattended point-of-sale terminal such as a commodity (e.g. gasoline) dispenser, automated check-out terminal or security checkpoint (e.g. a point of access to a secured facility or apparatus). In this case, once the card 100 was activated by entry of a PIN or other action to authenticate a user to the card, an NFC link 270 is formed simply by passing the card 100 in the proximity of the card reader portion of the point-of-sale device 220', whereupon required communications are conducted with or between the secure card processor 250 or the transaction processor 260 or both. This architecture provides the transitional advantage that the use of conventional credit cards or known NFC devices (e.g. so-called speed passes which are associated with existing credit card accounts) can be accommodated as they are currently through communication with only transaction processor 260 while transactions using the secure credit card in accordance with the invention or that of U.S. Pat. No. 6,641,050 can be authenticated and authorized by communication with secure card processor 250 which may either complete the transaction internally or provide secure authentication information to conventional transaction processor 260 to complete the transaction. It is contemplated that as use of the secure credit card in accordance with the invention or U.S. Pat. No. 6,641,050 becomes more widespread, more transaction processing will be gradually transferred to secure card processor 250 while transaction processing in conventional transaction processor 260 is gradually phased out. In any case, use of the secure credit card in accordance with the present invention will improve reliability of communications over time by avoiding mechanical contact with a card reader and improve speed of communications and establishment of communication links through use of NFC communications.

Figure 4:
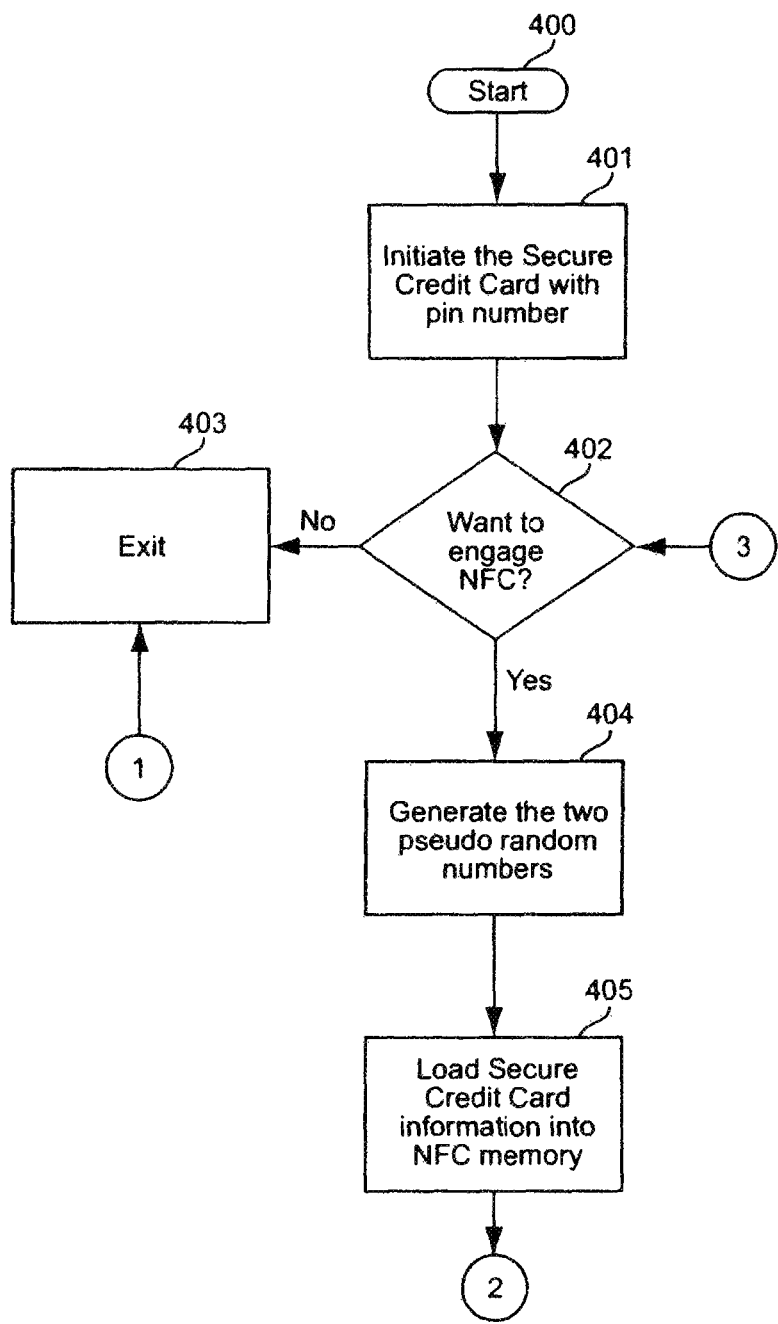
Figure 5:
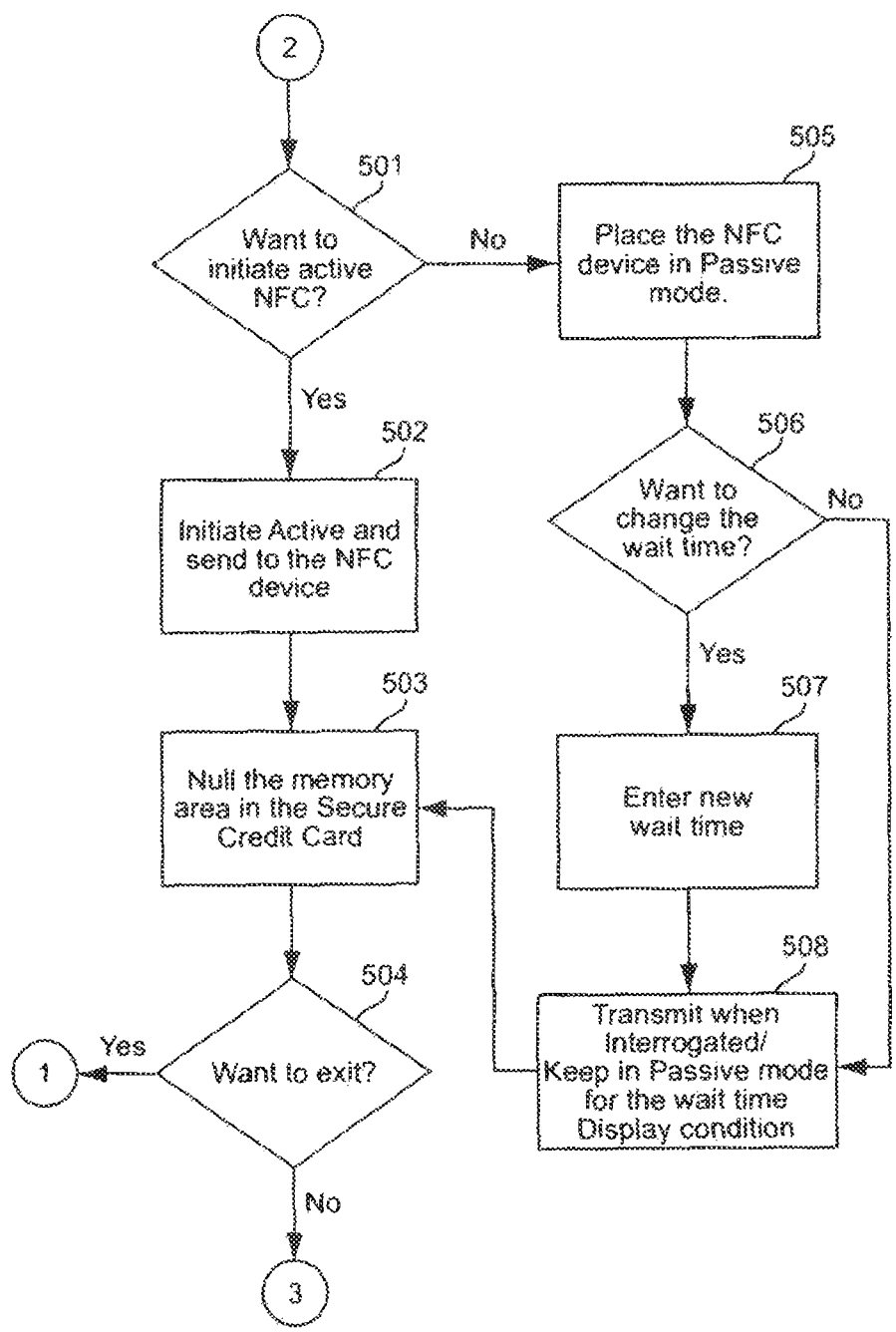

Referring now to FIGS. 4 and 5, operation of the secure credit card using NFC in accordance with the invention and additional meritorious effects and security features supported thereby will now be discussed. Starting at step 400 (which may involve actuation of a key or detectable event, or not, as may be desired), the secure credit card operation is initiated by entering the PIN of the user (which may be varied as disclosed in U.S. patent application Ser. No. 10/905,716, assigned to the assignee of the present invention and fully incorporated by reference) at step 401. At step 402, it is assumed for purposes of this discussion that the NFC feature or chip of the secure credit card in accordance with the present invention is not engaged and the user is prompted to indicate if it is desired to engage NFC. As will be discussed, the operation of the secure credit card of the present invention is arranged to automatically disengage or be disabled after a time-out period to reduce the possibility of capture of data therefrom although substantial safeguards against use of captured data are also provided in accordance with the above-incorporated U.S. Pat. No. 6,641,050. If not, or if there is no response to the prompt, the process exits at step 403. However, if the NFC feature of the present invention is to be engaged, two pseudo-random numbers or sequences thereof, alluded to above are generated at step 404 and the secure credit card information including the card identification number and the two pseudo-random numbers or sequences forming secure transaction information are loaded into memory in the NFC chip at step 405. This storage, generally provided in an NFC chip under current standards, allows the NFC chip to be interrogated while in a passive operational mode to cause delivery of the stored information. While interrogation in a passive mode is provided by known NFC chips, that function provides the additional advantage in the current invention of substantially avoiding power consumption, at least by the NFC chip (in which power consumption is minimal in any event) during a period between the time the chip is activated and generates security information and the time that information may be communicated to a transaction authentication system as discussed above in connection with FIGS. 2 and 3.

As illustrated in FIG. 5 (reached through cardinal point 2) the user is prompted as to whether active NFC operation should be initiated. Active NFC operation allows, in the arrangement of FIG. 2, for example, for a communication with a further communication device 210 to be initiated from the secure credit card itself by bringing the secure credit card within NFC range thereof rather than upon interrogation from such a device. This can be particularly useful when a transaction is to be performed partially or fully without involvement of a point-of-sale terminal or the like. This feature of the invention allows for the security information to be created, communicated, and destroyed in a very short period of time to reduce the possibility of capture of such information to a vanishingly small level. That is, active operation can be initiated and security data sent at step 502 and the NFC storage or a portion thereof reset to null at step 503 in a matter of a few seconds or less. Nulling the storage of the security information may be viewed as opening switch 195b alluded to above in connection with FIG. 1B. Since the storage of the NFC chip is reset to null after transmission, later interrogation, regardless of operational mode will cause transmission of, at most, the card identification code but not the pseudo-random information; clearly indicating that no transaction is intended or requested. The user is then prompted to exit at step 504 and, if so the process exits at step 403 reached through cardinal point 1. If the user does not wish to exit but wishes to re-engage the NFC chip, the process continues with step 402, reached through cardinal point 3.

If, however, the user wished, at step 501, to enter the passive mode of operation, the process would branch to step 505 in order to do so. The invention preferably establishes a default or previously set time period in which passive communication can occur upon interrogation of the NFC chip. This period is preferably short since security data including the pseudo-random data can be captured from the secure credit card during this period. However, it is considered that no significant or unjustified security risk is presented since another interrogating NFC device would need to be brought within the NFC range of less than 10 cm in order to perform such an interrogation. Even if such a feature is not provided, the transaction would cause rejection of the same security data sequences in an attempted subsequent transaction. On the other hand, providing for storage of security information for a limited period of time allows the card to be activated under circumstances of the user's choosing to minimize capture of other information such as by the surreptitious reading of the secure credit card display by other persons. It should be appreciated that imposing a limited time period during which interrogation can be performed is diametrically contrary to the principal function generally intended for NFC devices.

Returning to FIG. 5, the user is prompted to change the wait time at 506. This could be done in conjunction with display of a currently set or default wait time, as desired. If the wait time is to be changed (e.g. to correspond to an anticipated time of arrival at a point-of-sale terminal) that function is performed at step 507. In any case, the process continues with step 508 in which the security data is transmitted upon interrogation or the passive mode including retention of stored data is maintained for the set wait period. Then, when the security data is transmitted or the set wait period expires, the storage is nulled at step 503 and the user is again prompted to exit at 504. This looping to 503 allows the wait time period to be reset, with or without selective alteration of the wait time period, using newly generated secure transaction information. To alert the user to the possibility of capture of secure information, the user is preferably notified of any transmission 508 to avoid any possible ambiguity between unauthorized capture of the secure data and time-out; both of which cause nulling of the stored secure data in the NFC.

In view of the foregoing, it is seen that the use of an NFC device in combination with a secure credit card providing user and card authentication and unique pseudo-random security data provides additional flexibility in transactions, improved communication speed and reliability and several transaction authentication and authorization architectures which may be particularly useful and economically desirable during transitional periods as the system accommodating such secure credit cards is implemented. No specialized card reader is required but only the use or retrofitting of a known, commercially available NFC device in the secure credit card.

While the invention has been described in terms of a single preferred embodiment, those skilled in the art will recognize that the invention can be practiced with modification within the spirit and scope of the appended claims.

What is claimed is:

1. A computing device, comprising:
  at least one processor; and
  a memory coupled to the at least one processor and storing instructions that, when executed by the at least one processor, perform a method for initiating a payment transaction over a near-field communication channel, comprising:
    receiving, by the at least one processor, a generated identification code associated with account information, the generated identification code at least in part depending on the computing device;
    storing the identification code in the memory;
    interactively receiving, on the computing device, first input for activating a payment transaction process associated with the computing device;
    receiving, on the computing device, second input that utilizes identity information associated with a payment apparatus to authenticate an individual;
    receiving, by the computing device in a passive mode over the near-field communication channel, a request for the identification code;
    in response to the request for the identification code, generating, by the computing device, a transaction-specific authentication mechanism that is used to authenticate the identification code;
    transmitting the transaction-specific authentication mechanism and the identification code over the near-field communication channel;
    in response to nulling at least the transaction-specific authentication mechanism in the memory after the transmission of the transaction-specific authentication mechanism and the identification code, providing a prompt;
    interactively receiving, on the computing device, third input; and
    responsive to the third input, generating, by the computing device in an active mode, another transaction-specific authentication mechanism and another identification code for another transmission over the near field communication channel.

2. The computing device of claim 1, wherein the account information includes an account identification number.

3. The computing device of claim 1, further comprising instructions for providing a notification to a user that is associated with the account information in response to transmission of the transaction-specific authentication mechanism.

4. The computing device of claim 1, wherein the transaction-specific authentication mechanism includes a plurality of synchronized sequences of pseudo-random numbers.

5. A method for initiating a payment transaction over a near-field communication channel, comprising:
  receiving a generated identification code associated with account information of a form of payment, the identification code at least in part depending on a computing device;
  storing the identification code;
  interactively receiving, on the computing device, input that activates a payment transaction process associated with the computing device and authenticates identity information associated with an individual that owns the form of payment;
  receiving, by the computing device in a passive mode over the near-field communication channel, a request for the identification code;
  in response to the request for the identification code, generating, by the computing device, a transaction-specific authentication mechanism that is used to authenticate the identification code;
  transmitting at least the identification code from the computing device to a receiving device over the near-field communication channel;
  in response to nulling at least the transaction-specific authentication mechanism in a memory after the transmission of the transaction-specific authentication mechanism and the identification code, providing a prompt;

interactively receiving on the computing device, responsive to the prompt, a third input; and in response to the third input, generating, by the computing device in an active mode, another transaction-specific authentication mechanism and another identification code for another transmission over the near field communication channel.

6. The method of claim 5, wherein the input that authenticates the identity information is received through an input device.

7. The method of claim 5, wherein the transaction-specific authentication mechanism includes a plurality of synchronized sequences of pseudo-random numbers.

8. The method of claim 5, further comprising providing a notification to the individual that the identification code has been transmitted.

9. The computing device of claim 1, further comprising instructions for erasing the identification code in response to an expiration of a period of time.

10. The method of claim 5, further comprising erasing the identification code in response to an expiration of a period of time.

11. The method of claim 5, wherein the transaction-specific authentication mechanism is stored on a local storage device.

12. The method of claim 5, wherein the identification code is transmitted over the near-field communication channel to a point-of-sale terminal.

13. The method of claim 5, wherein the identification code is transmitted over the near-field communication channel when a device that stores secure transaction information is within a predetermined distance from a point-of-sale terminal.

14. A computing device, comprising:
at least one processor; and
a memory coupled to the at least one processor and storing instructions that, when executed by the at least one processor, perform operations, comprising:
receiving credit card account information;
generating an identification code based, at least in part, on the credit card account information, the identification code at least in part depending on the computing device;
storing the identification code in the memory;
generating a transaction-specific authentication mechanism that is associated with the identification code;
interactively receiving, on the computing device, input that activates a payment transaction process and verifies an identity of an individual that provided the input;
in response to the activation of the payment transaction process, providing the identification code and the transaction-specific authentication mechanism to a remote device over a near-field communication channel;
in response to nulling at least the transaction-specific authentication mechanism in the memory after the transmission of the transaction-specific authentication mechanism and the identification code, displaying a prompt;
interactively receiving on the computing device, responsive to the prompt, a third input; and
in response to the third input, generating, by the computing device in an active mode, another transaction-specific authentication mechanism and another identification code for another transmission over the near field communication channel.

15. The computing device of claim 14, further comprising instructions for erasing the identification code when a period of time has elapsed.

16. The computing device of claim 14, wherein the identification code is transmitted over the near-field communication channel to a point-of-sale terminal.

17. The computing device of claim 14, further comprising instructions for receiving a request for the identification code from a point-of-sale terminal.

18. The computing device of claim 14, further comprising instructions for providing a notification that the identification code has been transmitted over the near-field communication channel.

19. The computing device of claim 14, wherein the authentication mechanism is associated with a personal identification number.

20. The computing device of claim 1, wherein the transaction-specific authentication mechanism and the identification code is transmitted over the near-field communication channel to a point-of-sale terminal.

* * * * *